(12) United States Patent
Badichi

(10) Patent No.: US 12,458,884 B2
(45) Date of Patent: Nov. 4, 2025

(54) OBJECT VIEWABILITY DETERMINATION SYSTEM AND METHOD

(71) Applicant: Anzu Virtual Reality LTD., Tel Aviv (IL)

(72) Inventor: Michael Badichi, Tel Aviv (IL)

(73) Assignee: Anzu Virtual Reality LTD., Tel Aviv (IL)

( * ) Notice: Subject to any disclaimer, the term of this patent is extended or adjusted under 35 U.S.C. 154(b) by 607 days.

(21) Appl. No.: 17/203,958

(22) Filed: Mar. 17, 2021

(65) Prior Publication Data

US 2021/0205704 A1   Jul. 8, 2021
US 2025/0073583 A2   Mar. 6, 2025

Related U.S. Application Data

(63) Continuation of application No. 16/765,907, filed as application No. PCT/IL2018/051322 on Dec. 3, 2018, now Pat. No. 11,260,299.

(60) Provisional application No. 62/619,827, filed on Jan. 21, 2018.

(51) Int. Cl.
| | |
|---|---|
| *G06Q 30/02* | (2023.01) |
| *A63F 13/46* | (2014.01) |
| *A63F 13/53* | (2014.01) |
| *A63F 13/61* | (2014.01) |
| *G06Q 30/0242* | (2023.01) |

(52) U.S. Cl.
CPC ............ *A63F 13/53* (2014.09); *A63F 13/46* (2014.09); *A63F 13/61* (2014.09); *G06Q 30/02* (2013.01); *G06Q 30/0242* (2013.01)

(58) Field of Classification Search
CPC .......... A63F 13/53; A63F 13/46; A63F 13/61; G06Q 30/02; G06Q 30/0207–30/0277
See application file for complete search history.

(56) References Cited

U.S. PATENT DOCUMENTS

| | | | |
|---|---|---|---|
| 8,751,310 B2 | 6/2014 | van Datta et al. | |
| 9,180,369 B2 | 11/2015 | Willis et al. | |
| 10,783,548 B1* | 9/2020 | Bhowmick | G06Q 30/0242 |
| 2003/0187730 A1 | 10/2003 | Natarajan | |
| 2007/0025624 A1 | 2/2007 | Baumberg | |
| 2007/0242162 A1* | 10/2007 | Gutta | H04N 9/64 |
| | | | 348/E9.051 |
| 2008/0102947 A1* | 5/2008 | Hays | A63F 13/12 |
| | | | 463/31 |
| 2009/0219300 A1 | 9/2009 | Peleg et al. | |
| 2010/0100429 A1 | 4/2010 | McCloskey et al. | |
| 2010/0182340 A1* | 7/2010 | Bachelder | G02B 27/017 |
| | | | 345/633 |

(Continued)

FOREIGN PATENT DOCUMENTS

WO     2008001472           1/2008
WO     WO 2018/067731 A1 *  10/2017

*Primary Examiner* — Thuy N Nguyen

(74) *Attorney, Agent, or Firm* — S.J. Intellectual Property LTD.

(57) ABSTRACT

A system for calculating viewability scores of objects displayed within a viewport, the system comprising a processing resource configured to perform the following for at least one object of the objects: determine a first value indicative of a relative portion of the object from the viewport; and calculate a viewability score of the object, wherein the viewability score is calculated based on the first value.

15 Claims, 6 Drawing Sheets

(56) References Cited

U.S. PATENT DOCUMENTS

| | | | |
|---|---|---|---|
| 2010/0217666 A1* | 8/2010 | Belenguer | G06F 16/9577 709/224 |
| 2010/0278421 A1* | 11/2010 | Peters | G06T 7/90 382/162 |
| 2011/0115883 A1* | 5/2011 | Kellerman | G06F 3/013 348/169 |
| 2011/0157410 A1* | 6/2011 | Alcazar | H04N 23/88 348/E9.051 |
| 2011/0319160 A1* | 12/2011 | Arn | A63F 13/814 463/30 |
| 2012/0314086 A1 | 12/2012 | Hubel et al. | |
| 2013/0185164 A1 | 7/2013 | Pottjegort | |
| 2014/0037200 A1* | 2/2014 | Phillips | G06T 7/90 382/162 |
| 2014/0195330 A1 | 7/2014 | Lee et al. | |
| 2014/0229268 A1 | 8/2014 | Clapp | |
| 2014/0375645 A1 | 12/2014 | Bakalash | |
| 2015/0110340 A1* | 4/2015 | Harron | G06F 16/783 382/100 |
| 2016/0148433 A1* | 5/2016 | Petrovskaya | G02B 27/01 345/633 |
| 2016/0171954 A1* | 6/2016 | Guo | G06F 18/24 345/589 |
| 2016/0191815 A1* | 6/2016 | Annau | G06Q 30/0263 348/38 |
| 2016/0352971 A1* | 12/2016 | Kanematsu | H04N 1/60 |
| 2017/0103572 A1 | 4/2017 | Lin et al. | |
| 2017/0199888 A1 | 7/2017 | Toksoz et al. | |
| 2017/0359570 A1* | 12/2017 | Holzer | G06F 21/36 |
| 2017/0372380 A1* | 12/2017 | Candiotti | G06Q 30/0277 |
| 2017/0372389 A1* | 12/2017 | Busch | G06Q 10/06395 |
| 2018/0012378 A1 | 1/2018 | Khandpur | |
| 2019/0012681 A1* | 1/2019 | Guo | G06Q 10/067 |
| 2019/0244416 A1* | 8/2019 | Tamaoki | G09G 5/377 |
| 2019/0306434 A1* | 10/2019 | Annau | H04N 23/698 |
| 2020/0110262 A1* | 4/2020 | Bakos | G06F 3/012 |
| 2020/0394453 A1* | 12/2020 | Ma | G06T 7/12 |
| 2021/0193085 A1* | 6/2021 | Haas | G09G 5/10 |

* cited by examiner

OBJECT VIEWABILITY DETERMINATION SYSTEM AND METHOD

TECHNICAL FIELD

The invention relates to an object viewability determination system and method.

BACKGROUND

Content providers utilize Computer Graphics (CG) in order to provide content to viewers in various fields. These fields vary and may include virtual education, virtual collaboration tools, computerized training and simulation, on-line advertising, etc. Content providers desire to ensure that the content that is provided thereby, or at least some parts thereof, is actually viewable by the viewers.

CG are computer-generated objects, rendered and manipulated by a computer, and presented to a viewer. CG objects are drawn within a viewport. A viewport is a polygonal region of a screen used to display a portion of the total scene to be shown to the viewer (e.g. a web browser's displaying part of a document, a player's game console displaying part of the game scene, etc.). The content provider would like to ensure that the object is viewable in the viewport. For example, that the object is not partially (or completely) blocked by another object.

Therefore, there is a need to determine the viewability of the CG objects, drawn within the viewport, in the eyes of the viewer, to make sure that the content reaches its destination.

In addition, content providers would like to ensure viewability over time, ensuring that the content is viewable by the viewer for a certain amount of time. This measure is known as impression. An example usage of impression is in the on-line advertising field where impression is used by content providers to replace an ad after the as has reached an impression.

In addition, content providers would like to ensure a verified impression. A verified impression is an impression wherein the content provider can determine that the viewer has effectively viewed the object in the viewport over a period of time.

Current viewability determination methods are insufficient as they lack, inter alia, consideration of the relative portion of the object from the viewport wherein it is displayed. For example, the content may be present in the viewport, but it is too small to be noticed by the viewer. This deficiency may result in content providers considering content as reaching their destinations, while in fact the content was not viewed by the viewer.

There is thus a need in the art for a new object viewability determination system and method.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 9,180,369 (Willis et al.), published on Nov. 10, 2015, discloses a variety of processes for certifying the reporting of advertising impressions provided via video games are described. These certification processes optionally take advantage of automated techniques for verifying that when advertising data is provided a corresponding advertisement is provided within the video game. In addition, as software patches are often provided for video games, a recommended process for certifying patched software is also described. Reporting data associated with advertising impressions provided from uncertified video games is considered suspect and optionally discarded.

US Patent Application No. 2010/0100429 (McCloskey et al.) published on Apr. 22, 2010, discloses an ad system for use in a virtual environment. The ad system includes an ad engine integrated in an advertising enabled application, an advertising scheduling system, reporting software, impression metric processing software, and billing components wherein coordinates of ad object and camera data were made available to the ad engine during development of the application. Related methods of developing advertising enabled application software including an ad engine and use of a computer system for delivering ad content within a virtual environment are also provided.

US Patent Application No. 2008/0102947 (Hays et al.) published on May 1, 2008, discloses an advertisement delivery scheme and associated facility provide targeted advertisements for multiple video games without advertisers having to specify specific game titles in which they would like their advertisements placed. The targeted advertisements may be provided via a network connection while the video game applications are executed on gaming devices, or via other means. Advertisements may be targeted to groupings of one or more games, and or groupings of one or more players. Data about the presentation of advertisements, such as impression data, may be collected and reported on, along with other information tracked through a game playing device.

U.S. Pat. No. 8,751,310 (van Datta et al.), published on Jun. 10, 2014, discloses a targeted in-game advertising system is provided where advertising content may be delivered to a video game network environment. Advertisements may be delivered through the tagging of advertising assets in the video game environment according to one or more characteristics including user geographical location, personal preferences, a personal profile, video game preferences or video game genre. Methodologies for tracking advertising impressions are also provided based on monitoring the video game environment to determine the quality of impression to which the user is exposed in the video game environment.

International Patent Application No. 2008/001472 (Makino et al.) published on Jan. 3, 2008, discloses a visibility evaluation method for evaluating the visibility of an advertisement medium comprising the steps of setting one or plural sections on a surface of the advertisement medium; setting one or plural viewing point locations; calculating a color value obtained by converting a color of each the section for each viewing point location to a numerical value by ray tracing for each viewing point location; calculating a first visibility index value with respect to each section for each viewing point location based on that calculated color value; and calculating a second visibility index value with respect to the advertisement medium for each of the viewing point location by calculating a sum of the first visibility index values for each of the viewing point locations.

GENERAL DESCRIPTION

In accordance with a first aspect of the presently disclosed subject matter there is provided a system for calculating viewability scores of objects displayed within a viewport, the system comprising a processing resource configured to perform the following for at least one object of the objects: determine a first value indicative of a relative portion of the object from the viewport; and calculate a viewability score of the object, wherein the viewability score is calculated based on the first value.

In some cases, the processing resource is further configured to determine a second value indicative of relative portion of the object visible in the viewport, and wherein the viewability score is calculated also based on the second value.

In some cases, upon the first value being lower than a first low threshold, the viewability score is calculated based on a first under-threshold-value indicative of the first value being under the first low threshold.

In some cases, the first under-threshold-value is zero.

In some cases, upon the second value being lower than a second low threshold, the viewability score is calculated based on a second under-threshold-value indicative of the second value being under the second low threshold.

In some cases, the second under-threshold-value is zero.

In some cases, upon the first value being higher than a first high threshold, the viewability score is calculated based on a first over-threshold-value indicative of the first value being over the first high threshold.

In some cases, the first over-threshold-value is one.

In some cases, upon the second value being higher than a second high threshold, the viewability score is calculated based on a second over-threshold-value indicative of the second value being over the second high threshold.

In some cases, the second over-threshold-value is one.

In some cases, the processing resource is further configured to perform the following to determine the first value: determine (a) a plurality of points discretely distributed on the object, each point representing a section of the object; and (b) for each point of the points, if the point is visible to a user viewing the viewport; and divide the size of the sections represented by a corresponding point of the points determined to be visible, by the viewport's size.

In some cases, the determination if each point is visible to the user is made using ray tracing.

In some cases, the determination if each point is visible to the user is made using an object-id map.

In some cases, the object-id map is a stencil map, and wherein the stencil map maps all of the objects within the viewport.

In some cases, the processing resource is further configured to perform the following to determine the second value: determine (a) a plurality of points discretely distributed on the object, each point representing a section of the object; and (b) for each point of the points, if the point is visible to a user viewing the viewport; and divide the size of the sections represented by a corresponding point of the points determined to be visible, by the object size.

In some cases, the determination if each point is visible to the user is made using ray tracing.

In some cases, the determination if each point is visible to the user is made using an object-id map.

In some cases, the processing resource is further configured to identify an object impression, indicative of the viewability of the object over a time period, during which a plurality of frames are displayed to a user, exceeding a threshold, wherein at least part of the frames include at least part of the object, and wherein the viewability score is calculated for each frame.

In some cases, the processing resource is further configured to perform the following to identify the object impression: for each of the frames, calculate a frame object impression value, based on the object's viewability score calculated for the corresponding frame, and based on a time duration during which the corresponding frame is displayed.

In some cases, the processing resource is further configured to aggregate the frame object impression scores calculated for the frames, giving rise to an aggregated object impression value, and wherein upon the aggregated object impression value exceeding a threshold, the object impression is identified.

In some cases, the frame object impression value is calculated in real time.

In some cases, the aggregate is performed continuously.

In some cases, the processing resource is further configured to replace the object upon the object impression being identified.

In some cases, if the time period is less than a minimal time period threshold the processing resource is configured to perform the replace after the minimal time period, thereby improving the user's ability to view the object.

In some cases, the processing resource is configured to perform the replace after the minimal time period plus an additional random time period of up to a second threshold.

In some cases, the object is a video having a video time duration, and wherein if the time period is less than the video time duration, the processing resource is configured to perform the replace after the video time duration.

In some cases, the object is content to be displayed on the viewport.

In some cases, the content is an advertisement.

In some cases, a scene presented in the viewport is a three-dimensional scene.

In some cases, the object is a two-dimensional object.

In some cases, the object is a three-dimensional object.

In some cases, a scene presented in the viewport is a two-dimensional scene.

In some cases, the object is a two-dimensional object.

In some cases, the object is a three-dimensional object.

In some cases, the three-dimensional scene is an application scene.

In some cases, the application scene is a gaming application scene.

In some cases, the system further comprising a line-of-sight determination device, wherein the processing resource is further configured to perform the following for each frame of the frames, for identifying a focused object impression: obtain a line-of-sight reading, designating a point on the viewport obtained from the line-of-sight determination device associated with the corresponding frame; determine a distance between the object and the line-of-sight reading within the corresponding frame; and calculate a frame object focused impression value, based on the object's viewability score calculated for the corresponding frame, based on the distance determined for the corresponding frame, and based on a time duration during which the corresponding frame is displayed.

In some cases, the processing resource is further configured to aggregate the frame focused object impression values calculated for the frames, giving rise to an aggregated focused object impression value, and wherein upon the aggregated focused object impression value exceeding a threshold, the focused object impression is identified.

In some cases, the system further comprising a line-of-sight determination device, wherein the object impression is verified upon a line-of-sight, designating a point on the viewport obtained from the line-of-sight determination device, being below a distance threshold from the object within the plurality of frames.

In some cases, the object is displayed on a first part of the viewport and not displayed on a second part of the viewport.

In some cases, the processing resource is further configured to determine a third value indicative of color resemblance between colors of one or more corresponding sections of the object and desired colors for the corresponding sections, and wherein the viewability score is calculated also based on the third value.

In some cases, upon the third value being lower than a third low threshold, the viewability score will be calculated based on a third under-threshold-value indicative of the third value being under the third low threshold.

In some cases, the third under-threshold-value is zero.

In some cases, upon the third value being higher than a third high threshold, the viewability score will be calculated based on a third over-threshold-value indicative of the third value being over the third high threshold.

In some cases, the third over-threshold-value is one.

In some cases, the processing resource is further configured to determine a fourth value indicative of content resemblance between an appearance of content within the object and desired appearance of the content, and wherein the viewability score is calculated also based on the fourth value.

In some cases, the processing resource is further configured to perform the following for determining the fourth value: obtain two or more color values each representing a color of a corresponding section of a plurality of sections of the object; and calculate a ratio between at least one pair of the color values, wherein the fourth value is determined according to a difference between the first ratio and an expected ratio.

In some cases, upon the fourth value being lower than a fourth low threshold, the viewability score will be calculated based on a fourth under-threshold-value indicative of the fourth value being under the fourth low threshold.

In some cases, the fourth under-threshold-value is zero.

In some cases, upon the fourth value being higher than a fourth high threshold, the viewability score will be calculated based on a fourth over-threshold-value indicative of the fourth value being over the fourth high threshold.

In some cases, the fourth over-threshold-value is one.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
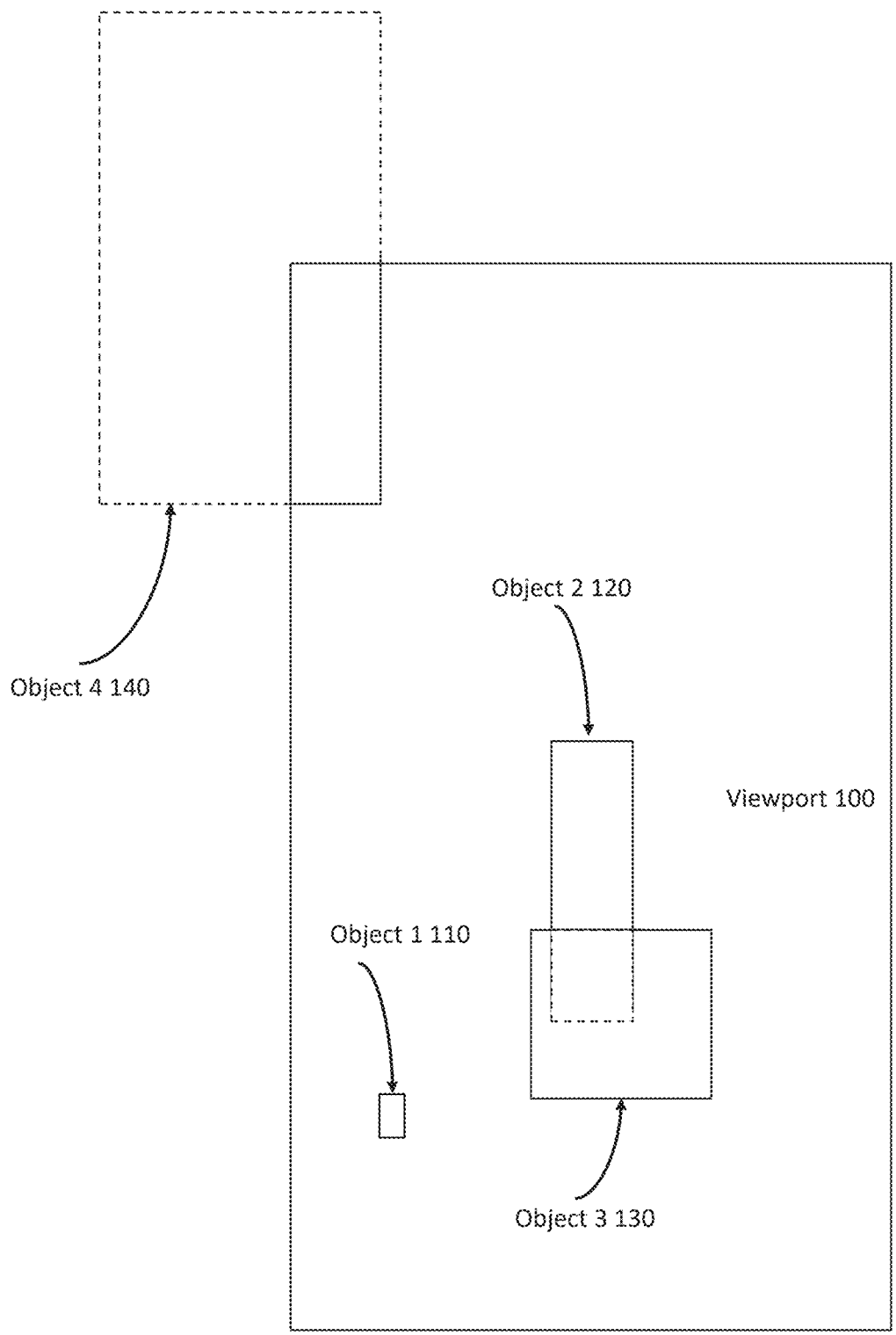
FIG. 1 is a block diagram schematically illustrating one example of an environment of an object viewability determination system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "determining", "calculating", "detecting", "aggregating", "identifying", "replacing" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
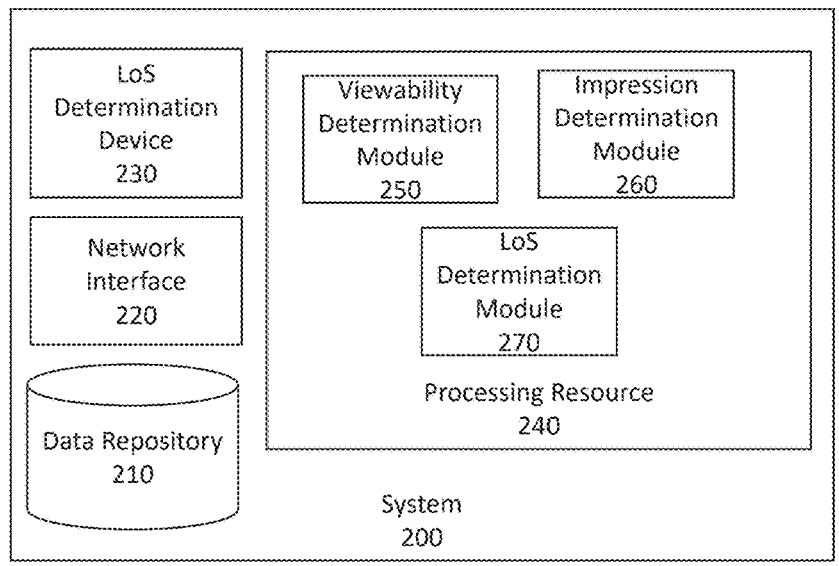
FIG. 2 is a block diagram schematically illustrating one example of an object viewability determination system, in accordance with the presently disclosed subject matter.
Figure 3:
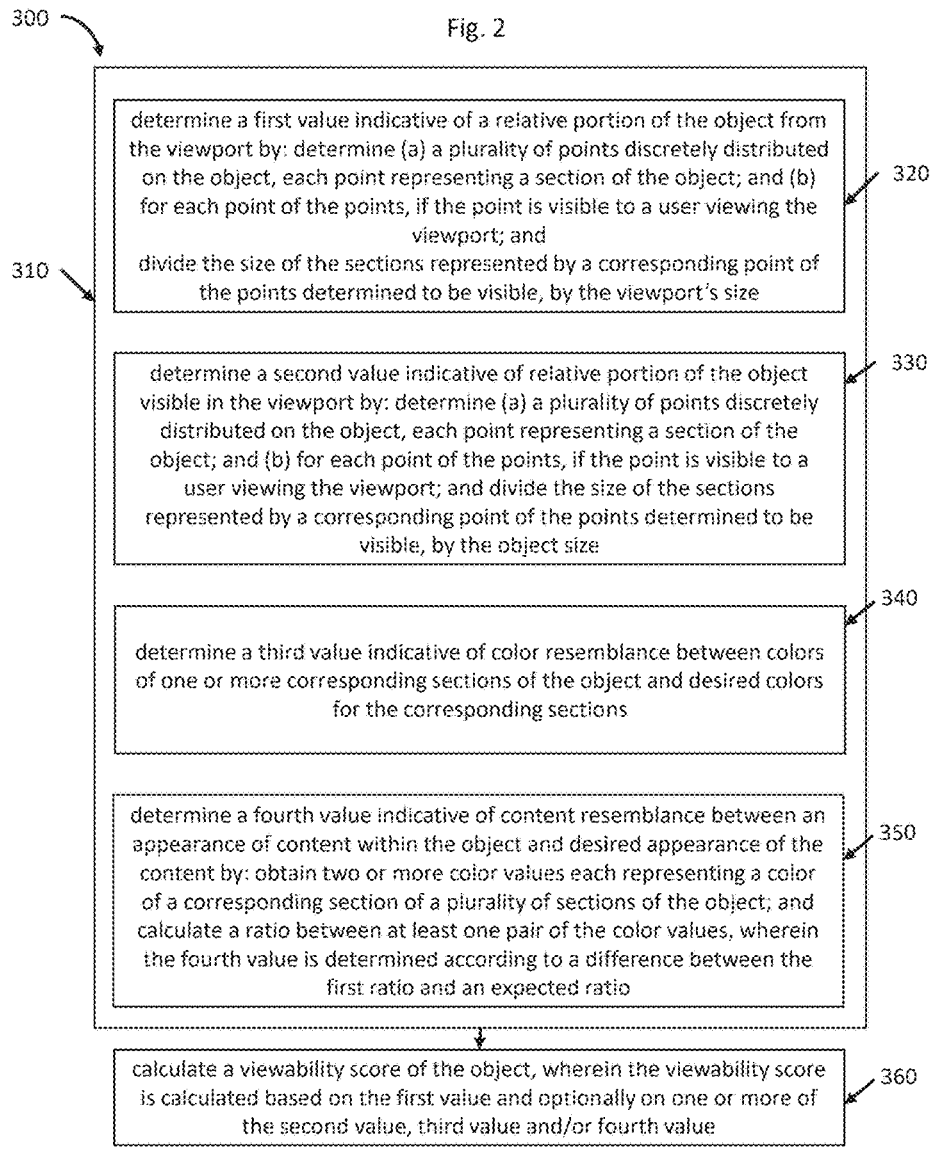
FIG. 3 is a flowchart illustrating one example of a sequence of operations carried out for determining a viewability score of an object, in accordance with the presently disclosed subject matter.
Figure 4:
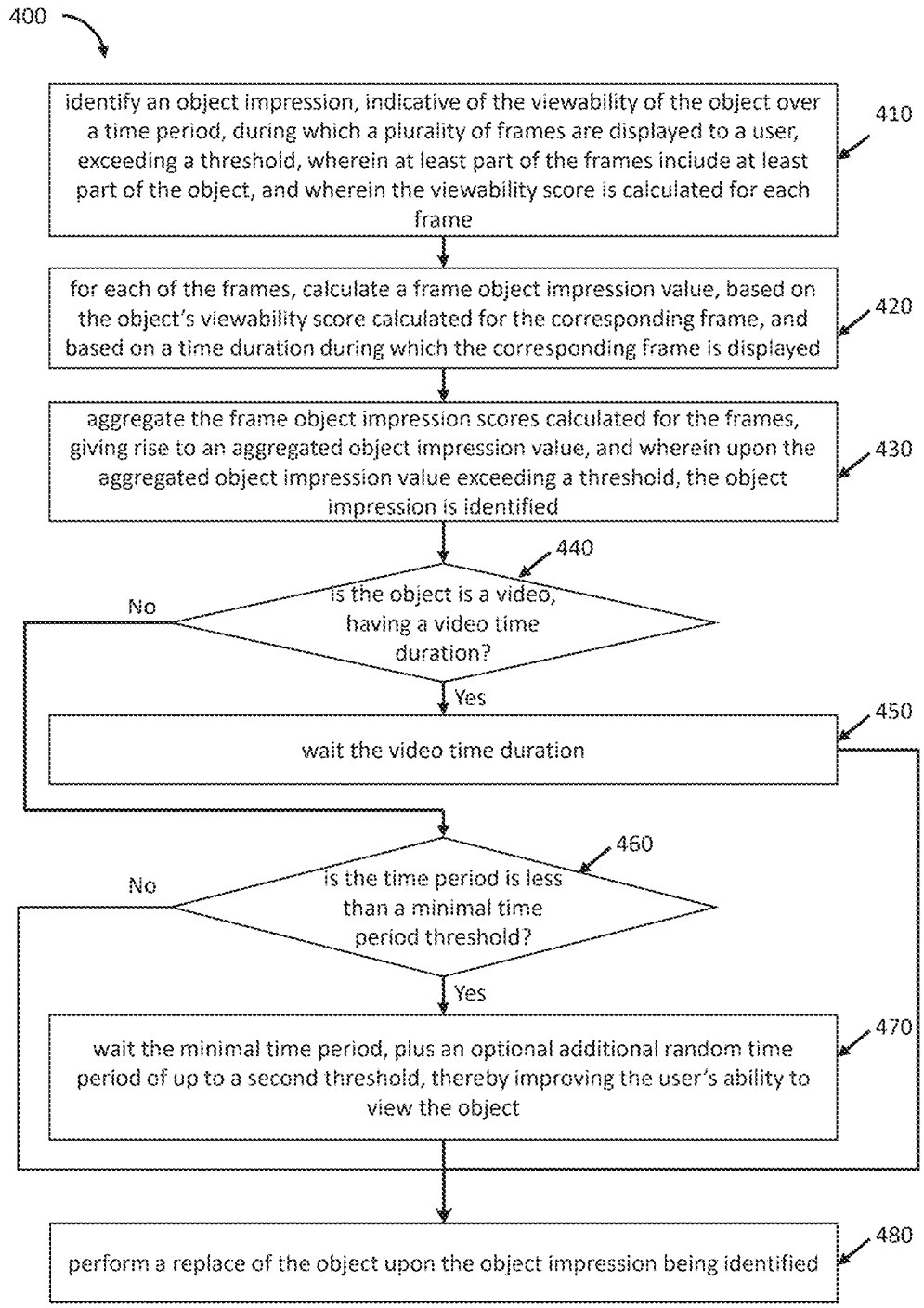
FIG. 4 is a flowchart illustrating one example of a sequence of operations carried out for identifying an object impression of an object, in accordance with the presently disclosed subject matter.
Figure 5:
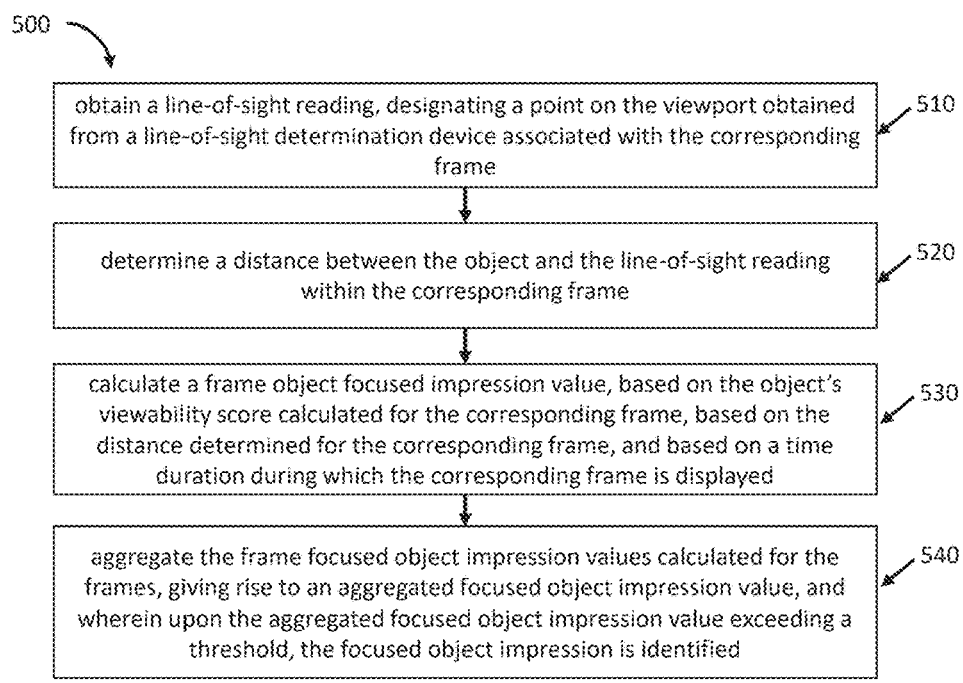
FIG. 5 is a flowchart illustrating one example of a sequence of operations carried out for determining an aggregated focused impression value of an object, in accordance with the presently disclosed subject matter.

In embodiments of the presently disclosed subject matter, fewer, more and/or different stages than those shown in FIG. 3-5 may be executed. In embodiments of the presently disclosed subject matter one or more stages illustrated in FIG. 3-5 may be executed in a different order and/or one or more groups of stages may be executed simultaneously. FIGS. 1-2 illustrate a general schematic of the system architecture in accordance with an embodiment of the presently disclosed subject matter. Each module in FIGS. 1-2 can be made up of any combination of software, hardware and/or firmware that performs the functions as defined and explained herein. The modules in FIGS. 1-2 may be centralized in one location or dispersed over more than one location. In other embodiments of the presently disclosed subject matter, the system may comprise fewer, more, and/or different modules than those shown in FIGS. 1-2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, is a block diagram schematically illustrating one example of an environment of an object viewability determination system, in accordance with the presently disclosed subject matter.

According to certain examples of the presently disclosed subject matter, a viewport 100 can be provided. Viewport 100 may be a polygonal region of a screen used to display a portion of a scene to a viewer.

The scene may include various Computer Graphic (GC) objects. CG objects are computer-generated images, rendered and manipulated by a computer, and presented to a viewer. CG objects are drawn within viewport 100. CG objects may be two-dimensional or three-dimensional objects.

The scene may be a two-dimensional scene, for example: a document to be presented to a viewer (e.g. a webpage to be presented in a web browser, where in such a case viewport 100 is the web browser's display).

The scene may alternatively be a three-dimensional scene, wherein viewport 100 may refer to a two-dimensional polygon onto which the three-dimensional scene is projected in accordance to a position of a virtual camera. A virtual camera can be defined by a virtual position (e.g. with respect to a certain object or point in the scene), a virtual orientation (e.g. with respect to a certain object or point/s in the scene) and a virtual viewing angle (the angle of view that the virtual camera encompasses/sees). The virtual position, and virtual orientation define a Point-of-View (POV) the virtual camera has of the scene and the virtual viewing angle defines the frames (being for example the still images which compose the video) that the virtual camera sees or acquires.

An example may be of a three-dimensional video game viewed on a game console display from the position of a virtual camera representing the POV of a player within the game, where in such a case viewport 100 is the player's game console display.

Viewport 100 may be the full screen of the viewer or part of the viewer's screen. In Virtual Reality (VR) or Augmented Reality (AR) the scene is displayed to the viewer via two screens (i.e. one screen for each eye of the viewer), for example via a VR headset or AR glasses worn by the viewer. In VR or AR, viewport 100 may be the two screens or parts of the two screens.

In the figure, a few exemplary objects to be displayed in viewport 100 are shown. The exemplary objects represent illustrations of different situations where viewability may be impaired due to various reasons.

Object 1 110 has a relative portion size from the viewport 100 that is below a threshold, for example, a 5% threshold, so that in-effect object 1 110 will not be considered viewable by the viewer of viewport 100. For example: Viewport 100 is displaying a three-dimensional scene and object 1 110 is far in the background with respect to the POV of the virtual camera, so that it's relative portion from the viewport 100 is less than 5%. Please note that the threshold may be a dynamic threshold, changing in accordance with various parameters of the scene—object's significance, object content type, type of viewport, type of viewer, etc.

Object 2 120 is partially blocked by object 3 130, effecting the viewability of object 2 120 displayed to the viewer in the viewport 100, therefore the viewability of object 2 120 is negatively affected by the presence of object 3 130. For example: object 2 120 is part of a document being displayed on a web browser, wherein viewport 100 is the web browser's display. Object 2 120 is partially blocked by object 3 130 that is part of the same document effecting the viewability of object 2 120. Another example may be that viewport 100 is displaying a three-dimensional scene. Object 2 120 and object 3 130 are displayed as part of the three-dimensional scene and the virtual camera is positioned in such a way that in the POV of the virtual camera, object 3 130 partially blocks object 2 120 from the viewer of viewport 100, therefore the viewability of object 2 120 is negatively affected by the presence of object 3 130. Further examples in this respect are provided with reference to FIGS. 6-9.

Object 4 140 is partly outside of viewport 100, thus only part of object 4 140 is displayed to the viewer of viewport 100 and the viewability of object 4 140 is below a threshold. For example: object 4 140 is part of a document being displayed on a web browser, wherein viewport 100 is the web browser's display. The viewer of viewport 100 scrolls the document such that object 4 140 is partially outside of viewport 100, thereby effecting the viewability of object 4 140.

It is to be noted that these are mere examples of situations in which the viewability of objects is impaired due to various reasons, and other situations not shown in this figure may also cause viewability impairment.

Turning to FIG. 2, there is shown a block diagram schematically illustrating one example of an object viewability determination system, in accordance with the presently disclosed subject matter.

According to certain examples of the presently disclosed subject matter, system 200 (also referred to herein as viewability determination system) can comprise, or be otherwise associated with, a data repository 210 (e.g. a database, a storage system, a memory including Read Only Memory—ROM, Random Access Memory—RAM, or any other type of memory, etc.) configured to store data, including, inter alia, viewability values, impression values and focused object impression values associated with one or more objects that their viewability should be determined, by system 200. The viewability determination of the objects can be performed by a viewability determination module 250, as further detailed herein.

System 200 may further comprise a network interface 220 (e.g. a network card, a WiFi client, a LiFi client, 3G/4G client, or any other component), enabling system 200 to communicate over a network with various delivery systems, that deliver objects to be displayed within the viewport 100, such as e-learning servers providing learning content, news servers, providing news-related content, ad servers providing ads, etc. In addition, the information about the viewability scores, impression identification and focused object impression values may be sent to a central location for use for obtaining insights.

System 200 may further comprise a LoS determination device 230. The LoS determination device 230 may designate a point on viewport 100 to which the viewer's gaze is directed. LoS determination device 230 may be a head mounted device worn by the viewer, glasses worn by the viewer or an eye tracking device that can measure the viewer's eye positions and eye movement.

System 200 further comprises a processing resource 240. Processing resource 240 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant system 200 resources and for enabling operations related to system 200 resources.

The processing resource 240 can one or more of the following modules: viewability determination module 250, impression determination module 260 and LoS determination module 270.

Viewability determination module 250 can be configured to determine viewability of objects, as further detailed herein, inter alia with reference to FIGS. 3, 6-9.

Impression determination module 260 can be configured to identify an object impression, as further detailed herein, inter alia with reference to FIG. 4.

LoS determination module 270 can be configured to determine an aggregated focused impression value of an object, as further detailed herein, inter alia with reference to FIG. 5.

Turning to FIG. 3, there is shown a flowchart illustrating one example of a sequence of operations carried out for determining a viewability score of an object, in accordance with the presently disclosed subject matter.

According to some examples of the presently disclosed subject matter, the viewability determination system 200 can be configured to perform a viewability determination process 300, e.g. utilizing the viewability determination module 250.

For this purpose, the viewability determination system 200 can be configured to calculate a viewability score of an object to be displayed in a viewport 100. The viewability score is calculated based on a first value and optionally on one or more of a second value, a third value and/or a fourth value (block 310).

The viewability determination system 200 may be configured to determine a first value indicative of a relative portion of the object from viewport 100 (block 320). For this purpose, the viewability determination system 200 can determine (a) a plurality of points discretely distributed on the object, each point representing a section of the object, and (b) for each point of the points—if the point is visible to a user viewing the viewport 100. The first value can be determined by dividing the size of the sections represented by a corresponding point of the points determined to be visible, by viewport's 100 size.

The determination of the visibility of each point of the points may be achieved by utilizing one or more of several methods.

One such possible method is ray tracing. Ray tracing is a rendering technique for generating an image by tracing the path of light as pixels in an image plane and simulating the effects of its encounters with virtual objects. Viewability determination system 200 may utilize ray tracing in order to determine if a certain point on an object is visible from a viewport 100, representing the display of a POV of a virtual camera.

Figure 6:
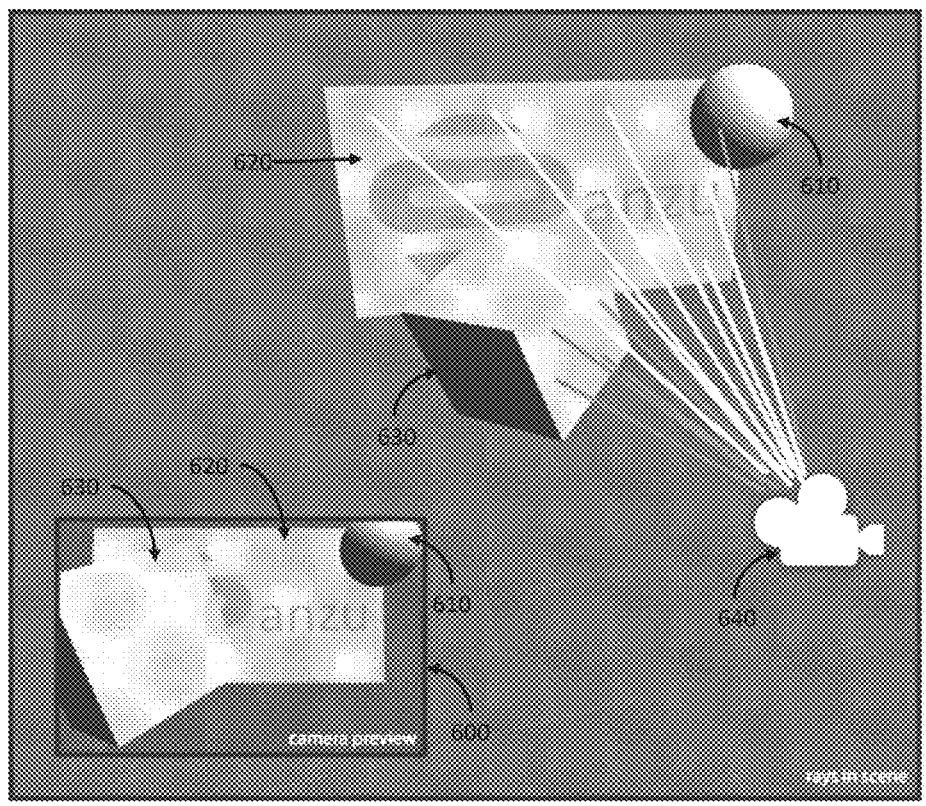
FIG. 6 is a diagram schematically illustrating one example of a scene of objects where a viewability determination system may use ray tracing, in accordance with the presently disclosed subject matter.

FIG. 6 is a diagram schematically illustrating one example of a scene of objects where a viewability determination system may use ray tracing, in accordance with the presently disclosed subject matter. Object 620 is partially blocked by objects 610 and 630 from the POV of virtual camera 640. A plurality of points are discretely distributed on object 620, each point representing a section of object 620. Rays are traced from the virtual camera 640 to the plurality of points on object 620. Rays that reach their point destination on object 620 (i.e. not blocked by other objects) are indication that the section of object 620 represented by that point is visible (indicated in FIG. 6 by light colored rays). Rays that do not reach their point destination on object 620 (i.e. are blocked by other objects) are indication that the section of object 620 represented by that point is not visible (indicated in FIG. 6 by dark colored rays).

Another possible method for determining the visibility of each point of the points is an object-id map. In the object-id map method, each object to be drawn is given an identification and a corresponding mask map is created to reflect the order of drawing of the identified objects (i.e. which object is drawn on top of the other objects). System 200 may utilize object-id map in order to determine if a certain point on an object is visible from a viewport 100, representing the display of a POV of a virtual camera. One example of an object-id map is a stencil map, mapping all of the objects within the viewport 100.

It is to be noted that these are merely examples and other methods and/or techniques can be used in order to determine the visibility of various points of an object displayed within the viewport 100.

Figure 7:
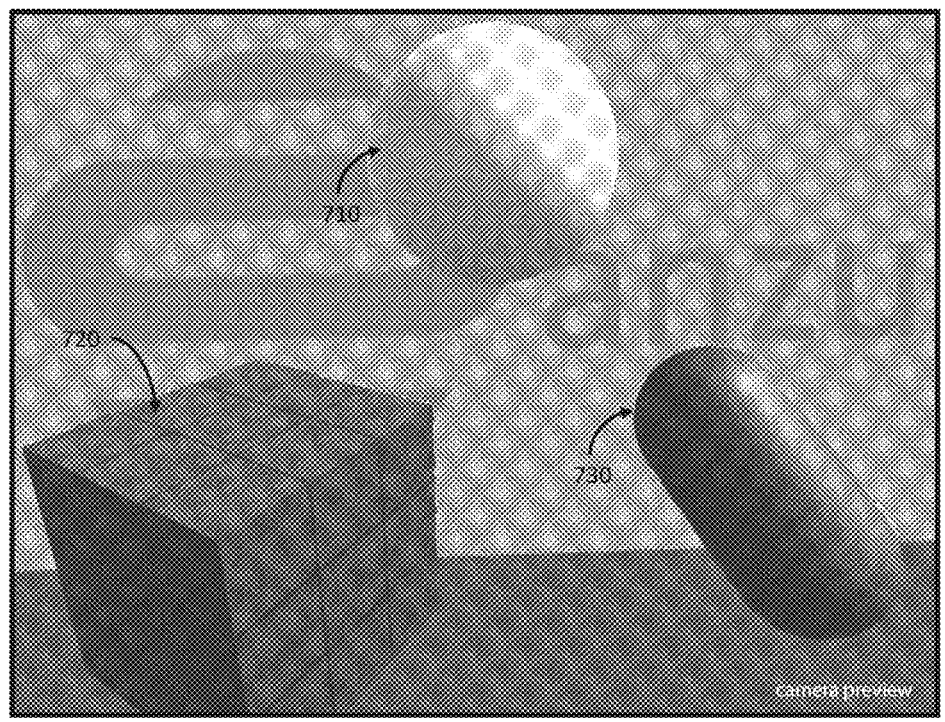
FIG. 7 is a diagram schematically illustrating one example of a scene of objects where a viewability determination system may use an object-id map, in accordance with the presently disclosed subject matter.
Figure 8:
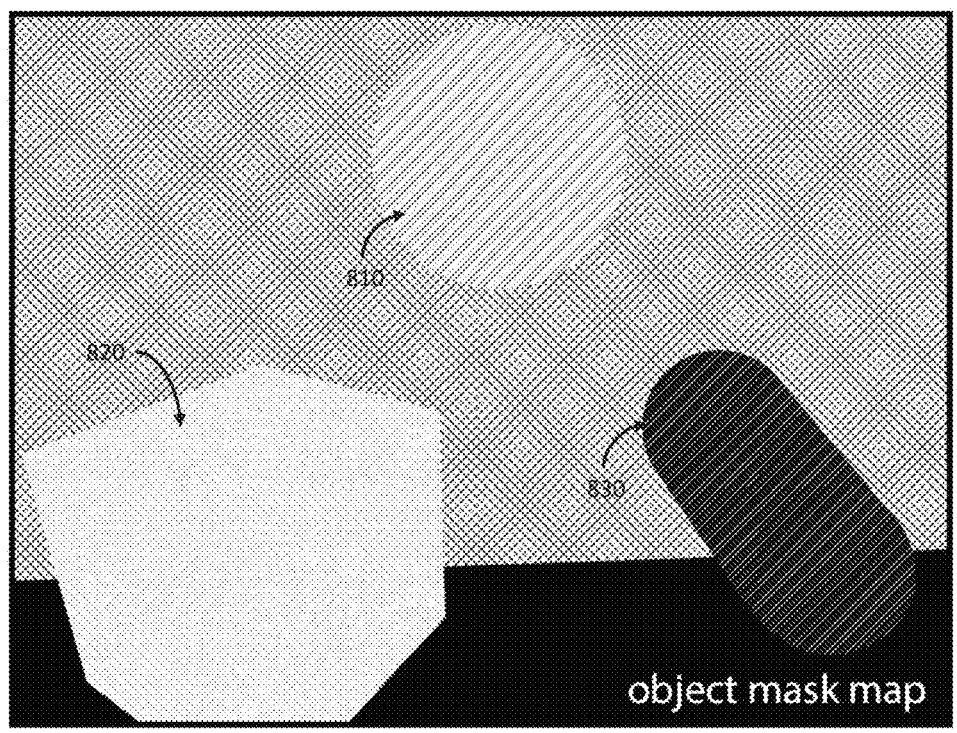
FIG. 8 is a diagram schematically illustrating one example of an object-id map, in accordance with the presently disclosed subject matter.

FIG. 7 is a diagram schematically illustrating one example of a scene of objects where a viewability determination system may use an object-id map, in accordance with the presently disclosed subject matter. Objects 710, 720 and 730 are shown as part of the illustrated scene. FIG. 8 is a diagram schematically illustrating one example of an object-id map, in accordance with the presently disclosed subject matter. The object-id map in FIG. 8 matches the scene illustrated if FIG. 7, where objects 810, 820 and 830 represent the mask map of objects 710, 720 and 730 of FIG. 7 respectively. As illustrated in FIGS. 7-8, the object mask map can help in determining if a point of a specific object is visible or blocked by other objects of the scene, wherein a point is represented by an (X, Y) coordinated within the viewport 100, wherein the (X, Y) coordinates may represent three-dimensional objects in a three-dimensional scene, rendered to a two-dimensional map within viewport 100.

Having shown some examples of techniques for determining the visibility of various points of an object displayed within the viewport 100, attention is drawn back to Block 320 of FIG. 3. As indicated above, a first value is calculated for one or more objects within the viewport 100, being indicative of a relative portion of the object from viewport 100. In some cases, if the first value is lower than a first low threshold the viewability score will be calculated based on a first under-threshold-value indicative of the first value being under the first low threshold. In some cases, the first under-threshold-value is zero.

An example of the first low threshold may be 0.5% of the viewport's 100 size. In such an example, if a specific object's relative portion from viewport 100, is less than 0.5%, the specific object may not be considered viewable to a viewer of viewport 100. In such a case, the first under-threshold-value that will be used in the viewability score calculation for the specific object will be zero. Please note that this is a mere example and in other cases the first low threshold may be 1%, 5%, 10% or 20% or other, optionally depending on different use-cases.

In some cases, if the first value is higher than a first high threshold, the viewability score will be calculated based on a first over-threshold-value indicative of the first value being over the first high threshold. In some cases, the first over-threshold-value is one.

An example of the first high threshold may be 6% of the viewport's 100 size. In such an example, if a specific object's relative portion from viewport 100, is more than 6%, the specific object may be considered fully viewable to a viewer of viewport 100. In such a case, the first over-threshold-value that will be used in the viewability score calculation for the specific object will be one. Please note that this is a mere example and in other cases the first high threshold may be 0.5%, 1%, 10% or 20% or other, optionally depending on different use-cases.

Having determined the first value, the viewability determination system 200 may be optionally configured to determine a second value indicative of relative portion of the object visible in the viewport 100. This can be made by: (a) determining a plurality of points discretely distributed on the object, each point representing a section of the object and (b) for each point of the points, if the point is visible to a user viewing the viewport 100. The second value can be calculated as the product of dividing the size of the sections represented by a corresponding point of the points determined to be visible, by the object size (block 330).

The determination of the visibility of each point of the points may be achieved by utilizing one or more of several methods as detailed above.

In some cases, upon the second value being lower than a second low threshold, the viewability score is calculated based on a second under-threshold-value indicative of the second value being under the second low threshold. In some cases, the second under-threshold-value is zero.

In some cases, if the second value being higher than a second high threshold, the viewability score will be calculated based on a second over-threshold-value indicative of the second value being over the second high threshold. In some cases, the second over-threshold-value is one.

An example of the second high threshold may be 50% of the object's size is viewable in viewport 100. In such an example, if a specific object's viewable size in viewport 100, is more than 50% of the specific object's size, the specific object may be considered fully viewable to a viewer of viewport 100. In such a case, the second over-threshold-value that will be used in the viewability score calculation for the specific object will be one. Please note that this is a mere example and in other cases the second high threshold may be 1%, 10%, 60% or 70% or other, optionally depending on different use-cases.

The viewability determination system 200 may be optionally configured to determine a third value indicative of color resemblance between colors of one or more corresponding sections of the object and desired colors for the corresponding sections (block 340).

Figure 9:
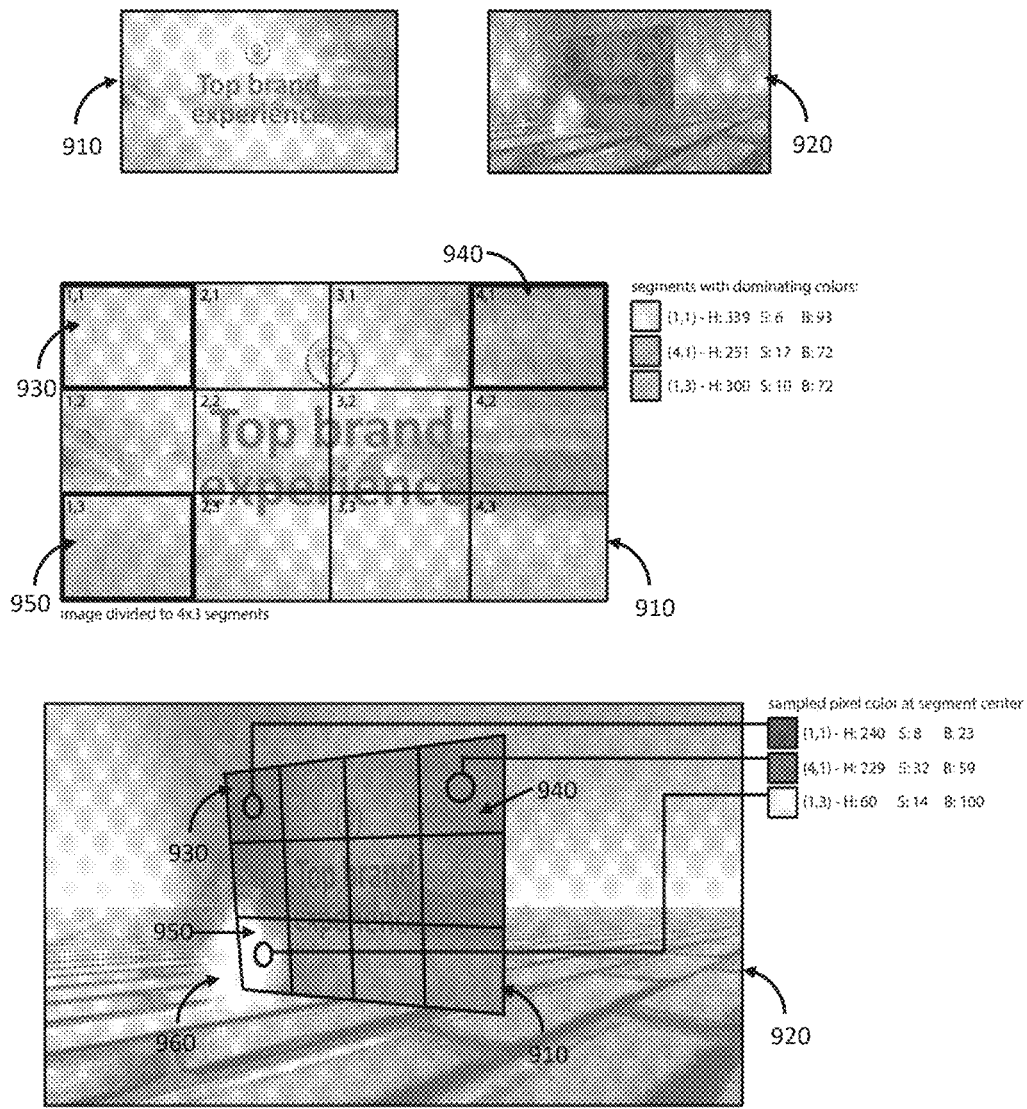
FIG. 9 is a diagram schematically illustrating one example of a scene of objects where a viewability determination system may determine a color resemblance value and a content resemblance value, in accordance with the presently disclosed subject matter.

The determination of the color resemblance may be achieved by utilizing one or more of method and/or techniques. One such color resemblance determination method is detailed herein and illustrated in FIG. 9. FIG. 9 is a diagram schematically illustrating one example of a scene comprising objects where a viewability determination system may determine a color resemblance value and a content resemblance value, in accordance with the presently disclosed subject matter.

The example illustrated in FIG. 9 is of object 910, having desired colors and of scene 920 that is viewed in viewport 100 showing object 910 with the actual colors as viewed by the viewer. The color resemblance determination method includes identifying one or more segments of object 910 with dominating desired colors. Dominating desired color is determined, for example, by calculating the average Red Green Blue (RGB) values of the pixels within each segment, and determine if all RGB values of the pixels in the segment are within a threshold distance from the average RGB values. It should be noted that this is a mere example of one method of calculation of color dominance and other methods and or techniques may be used, mutatis mutandis. It is to be noted that wherever RGB is referred, any other color encoding scheme may be used, including for example Hue, Saturation, Brightness (HSB), YUV (luminance, chroma, violet) or any other color encoding scheme.

Looking, for illustrative purposes at FIG. 9, segments 930, 940 and 950 are determined to have dominating desired colors, whereas other segments of object 910 have less dominant colors spread throughout the segment. For example, the RGB values of the pixels within other segments of object 910 (other than segments 930, 940 and 950), have a variance that is above a certain threshold that is not surpassed by the variance of the RGB values of the pixels within segments 930, 940 and 950.

The dominating desired colors are recorded for each of the segments. The actual colors of segments 930, 940 and 950 (determined to have dominating desired colors) as displayed in viewport 100 are than determined and compared to the corresponding desired colors of each of the segments determined to have dominating desired colors.

The measure of resemblance for the expected and actual colors for each segment is the basis for the calculation of the third value. An example may be that the actual colors of object 910 as displayed in the viewport 100 are different than the expected colors of object 910 when object 910 is rendered in scene 920 in darker colors when viewed for example in a night time occurring scene.

In the illustrated example shown in FIG. 9, it can be appreciated that the actual colors of segments 930 and 940 as seen within the viewport 100 (showing scene 920), substantially resemble the expected colors, whereas the actual colors of segment 950 as seen within the viewport 100 (showing scene 920) do not resemble the expected colors, due to a flame of the explosion that took place in the scene 920 within the area covered by segment 950.

Having shown some examples of techniques for determining the color resemblance value of an object displayed within the viewport 100, attention is drawn back to Block 340 of FIG. 3. As indicated above, a third value is calculated for one or more objects within the viewport 100, being indicative the color resemblance of each object with respect to the desired colors of the respective object. In some cases, if the third value being lower than a third low threshold, the viewability score will be calculated based on a third under-threshold-value indicative of the third value being under the third low threshold. In some cases, the third under-threshold-value is zero.

An example of the third low threshold may be 20% of the color resemblance value of a specific object displayed within the viewport 100 with respect to the desired colors of the specific object. In such an example, if a specific object's color resemblance value is lower than 20% with respect to the desired colors of the specific object, the specific object may be considered not to be color resembling to the desired colors. In such a case, the third under-threshold-value that will be used in the viewability score calculation for the specific object will be zero. Please note that this is a mere example and in other cases the third low threshold may be 5%, 30%, 50% or 60% or other, optionally depending on different use-cases.

In some cases, if upon the third value being higher than a third high threshold, the viewability score will be calculated based on a third over-threshold-value indicative of the third value being over the third high threshold. In some cases, the third over-threshold-value is one.

An example of the third high threshold may be 60% of the color resemblance value of a specific object displayed within the viewport 100 with respect to the desired colors of the specific object. In such an example, if a specific object's color resemblance value is more than 60% with respect to the desired colors of the specific object, the specific object may be considered to be color resembling to the desired colors. In such a case, the third over-threshold-value that will be used in the viewability score calculation for the specific object will be one. Please note that this is a mere example and in other cases the third high threshold may be 20%, 40%, 70% or 90% or other, optionally depending on different use-cases.

The viewability determination system 200 may be optionally configured to determine a fourth value indicative of content resemblance between an appearance of content within the object and desired appearance of the content. This can be made by obtaining two or more color values, each representing a color of a corresponding segments of a plurality of segments of the object; and calculating a ratio between at least one pair of the color values, wherein the fourth value is determined according to a difference between the first ratio and an expected ratio (block 350).

The determination of the content resemblance may be achieved by utilizing one or more of several methods. One such content resemblance method is detailed herein and illustrated in FIG. 9. FIG. 9 is a diagram schematically illustrating one example of a scene of objects where a viewability determination system may determine a color resemblance value and a content resemblance value, in accordance with the presently disclosed subject matter.

In continuation of the explanation above, the content resemblance method includes identifying two or more segments of object 910 with dominating desired colors, for example segments 930, 940 and 950 and calculating the ratio between the dominating desired colors of these segments. This ratio is indicative of the content outline (i.e. the contrast between the expected colors of object 910). The actual ratio may differ from the expected ratio, for example when the actual object 910 is displayed as seen through a stained-glass window, deforming object's 910 content color ratio in a way that impairs the viewability of object 910 for the viewer of the viewport 100.

It is to be noted that the color values may be obtained from different frames of the same scene 920.

Having shown some examples of techniques for determining the content resemblance value of an object displayed within the viewport 100, attention is drawn back to Block 350 of FIG. 3. As indicated above, a fourth value is calculated for one or more objects within the viewport 100, being indicative the content resemblance of each object with respect to the desired content of the respective object. In some cases, if the fourth value being lower than a fourth low threshold, the viewability score will be calculated based on a fourth under-threshold-value indicative of the fourth value being under the fourth low threshold. In some cases, the fourth under-threshold-value is zero.

An example of the fourth low threshold may be 20% of the content resemblance value of a specific object displayed within the viewport 100 with respect to the desired content of the specific object. In such an example, if a specific object's content resemblance value is lower than 20% with respect to the desired content of the specific object, the specific object may be considered not to be content resembling to the desired content. In such a case, the fourth under-threshold-value that will be used in the viewability score calculation for the specific object will be zero. Please note that this is a mere example and in other cases the fourth low threshold may be 5%, 30%, 50% or 60% or other, optionally depending on different use-cases.

In some cases, if the fourth value being higher than a fourth high threshold, the viewability score will be calculated based on a fourth over-threshold-value indicative of the fourth value being over the fourth high threshold. In some cases, the fourth over-threshold-value is one.

An example of the fourth high threshold may be 60% of the content resemblance value of a specific object displayed within the viewport 100 with respect to the desired content of the specific object. In such an example, if a specific object's content resemblance value is more than 60% with respect to the desired content of the specific object, the specific object may be considered to be content resembling to the desired content. In such a case, the fourth over-threshold-value that will be used in the viewability score calculation for the specific object will be one. Please note that this is a mere example and in other cases the fourth high threshold may be 20%, 40%, 70% or 90% or other, optionally depending on different use-cases.

After block 310 (i.e. block 320 and optionally one or more of blocks 330, 340 and/or 350), the viewability determination system 200 can be further configured to calculate a viewability score of the object (block 360). The viewability score can be calculated based on the first value and optionally on one or more of the second value, third value and/or fourth value, if such values are calculated.

It is to be noted that, with reference to FIG. 3, some of the blocks can be integrated into a consolidated block or can be broken down to a few blocks and/or other blocks may be added. Furthermore, in some cases, the blocks can be performed in a different order than described herein (for example, block 340 can be performed before block 330, block 350 can be performed before block 360, etc.). It is to be further noted that some of the blocks are optional. It should be also noted that whilst the flow diagram is described also with reference to the system elements that realizes them, this is by no means binding, and the blocks can be performed by elements other than those described herein.

Attention is drawn to FIG. 4, showing a flowchart illustrating one example of a sequence of operations carried out for identifying an object impression of an object, in accordance with the presently disclosed subject matter.

According to some examples of the presently disclosed subject matter, the viewability determination system 200 can be configured to perform an impression determination process 400, e.g. utilizing the impression determination module 260.

For this purpose, the viewability determination system 200 can be configured to identify an object impression (block 410). An object impression is indicative of the viewability of the object over a time period. In order to determine achievement of an object impression, the viewability of the object is required to exceed a threshold during the time period while a plurality of frames are displayed to a user, wherein at least part of the frames include at least part of the object, and wherein the viewability score is calculated for each frame.

The viewability determination system 200 may be configured to calculate, for each of the frames, a frame object impression value, based on: (a) the object's viewability score calculated for the corresponding frame, and (b) a time duration during which the corresponding frame is displayed (block 420).

Having calculated the frame object impression value, for each frame of the frames, the viewability determination system 200 may be configured to aggregate the frame object impression scores calculated for the frames, giving rise to an aggregated object impression value. Upon the aggregated object impression value exceeding a threshold—the object impression is identified (block 430).

In some cases, the frame object impression value is calculated in real time. In some cases, the aggregation (as detailed with reference to block 430) is performed continuously.

After the object impression is identified, the viewability determination system 200 can be configured to check if the object is a video, having a video time duration (block 440). If yes, the system 200 waits an additional time required for the video to finish playing (i.e. so that the object is not replaced until the video time duration passes from beginning of playing of the video) (block 450). After the video time duration passes, the system 200 replaces the object (block 480).

If, however, the object is not a video, the system 200 can be configured to check if the time period that passed until impression determination is less than a minimal time period threshold (block 460). If not—the system 200 replaces the object (block 480). If, however, the time period that passed until impression determination is less than a minimal time period threshold, the system 200 can be configured to wait additional time, as to complete the time period passed until impression determination up to the minimal time period, plus an optional additional random time period of up to a second threshold, thereby improving the user's ability to view the object (block 470). After the additional time passes, the system 200 can be configured to replace the object (block 480).

In some cases, the object is an ad and the replacement of the object upon the object impression being identified is the replacement of an existing ad with a new ad.

It is to be noted, that in some cases, if the second value being lower than a second low threshold, the viewability score will be calculated based on a second under-threshold-value indicative of the second value being under the second low threshold.

It is to be further noted that, with reference to FIG. 4, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 5 is a flowchart illustrating one example of a sequence of operations carried out for determining an aggregated focused impression value of an object, in accordance with the presently disclosed subject matter.

According to some examples of the presently disclosed subject matter, the viewability determination system 200 can be configured to perform an aggregated focused impression determination process 500, e.g. utilizing the LoS determination module 270.

For this purpose, the viewability determination system 200 can be configured to obtain a line-of-sight reading, designating a point on the viewport 100 obtained from a line-of-sight determination device associated with the corresponding frame, wherein the point represents the viewer's focus within the viewport 100 (i.e. the viewer's behavioral attention—the point to which the viewer's view is directed) (block 510).

Having obtained a line-of-sight reading, the viewability determination system 200 may be configured to determine a distance (i.e. the radius distance between the line-of-sight reading and the object) between the object and the line-of-sight reading within the corresponding frame (block 520).

After determining a distance between the object and the line-of-sight reading within the corresponding frame, the viewability determination system 200 may be configured to calculate a frame object focused impression value, based on the object's viewability score calculated for the corresponding frame, based on: (a) the distance determined for the corresponding frame, and (b) a time duration during which the corresponding frame is displayed (block 530).

Having calculated a frame object focused impression value, the viewability determination system 200 may be configured to aggregate the frame focused object impression values calculated for the frames, giving rise to an aggregated focused object impression value (block 540). Upon the aggregated focused object impression value exceeding a threshold, the focused object impression is identified (block 540).

It should be noted that although the foregoing discussion has referred in some places to a single object, all of the methods and processes disclosed herein may be performed on multiple objects, including objects within the same viewport 100, optionally simultaneously.

It is to be noted that, with reference to FIG. 5, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for determining viewability of an object displayed within a scene, the system comprising one or more processing units configured to:
   divide said object displayed within said scene into a plurality of segments, each composed of a plurality of pixels;
   for each segment of said plurality of segments, determine an average color value based on color encoding values of the pixels within the segment;
   identify one or more segments having a dominating desired color, wherein a segment is determined to have a dominating desired color if the color encoding values of the pixels in the segment are within a threshold distance from the average color value of that segment;
   determine an actual color for each of the segments having a dominating desired color, based on visual data of the object as displayed in a rendered scene;
   compare, for each segment having a dominating desired color, the actual color of the segment to a corresponding desired color to generate a color resemblance value; and,
   based on the color resemblance values of the dominating color segments, calculate a viewability score of the object, being indicative of the object's visibility within said scene.

2. The system of claim 1, wherein upon the color resemblance value being lower than a low threshold, the viewability score is calculated based on an under-threshold-value indicative of the color resemblance value being under the low threshold.

3. The system of claim 2, wherein the under-threshold-value is zero.

4. The system of claim 1, wherein upon the color resemblance value being higher than a high threshold, the viewability score is calculated based on an over-threshold-value indicative of the color resemblance value being over the high threshold.

5. The system of claim 4, wherein the over-threshold-value is one.

6. The system of claim 1, wherein the processing resource is further configured to determine a second value indicative of a relative portion of the object from the viewport, and wherein the viewability score is calculated also based on the second value.

7. The system of claim 1, wherein the processing resource is further configured to determine a third value indicative of relative portion of the object visible in the viewport, and wherein the viewability score is calculated also based on the third value.

8. A method for determining viewability of an object displayed within a scene, the method comprising:
   dividing said object displayed within said scene into a plurality of segments, each composed of a plurality of pixels;
   for each segment of said plurality of segments, determining an average color value based on color encoding values of the pixels within the segment;
   identifying one or more segments having a dominating desired color, wherein a segment is determined to have a dominating desired color if the color encoding values of the pixels in the segment are within a threshold distance from the average color value of that segment;
   determining an actual color for each of the segments having a dominating desired color, based on visual data of the object as displayed in a rendered scene;
   comparing, for each segment having a dominating desired color, the actual color of the segment to a corresponding desired color to generate a color resemblance value; and,
   based on the color resemblance values of the dominating color segments, calculating a viewability score of the object, being indicative of the object's visibility within said scene.

9. The method of claim 8, wherein upon the color resemblance value being lower than a low threshold, the viewability score is calculated based on an under-threshold-value indicative of the color resemblance value being under the low threshold.

10. The method of claim 9, wherein the under-threshold-value is zero.

11. The method of claim 8, wherein upon the color resemblance value being higher than a high threshold, the viewability score is calculated based on an over-threshold-value indicative of the color resemblance value being over the high threshold.

12. The method of claim 11, wherein the over-threshold-value is one.

13. The method of claim 8, further comprising determining, by the processing resource, a second value indicative of a relative portion of the object from the viewport, and wherein the viewability score is calculated also based on the second value.

14. The method of claim 8, further comprising determining, by the processing resource, a third value indicative of relative portion of the object visible in the viewport, and wherein the viewability score is calculated also based on the third value.

15. A non-transitory computer readable storage medium having computer readable program code embodied there-with, the computer readable program code, executable by at least one processing resource of a computer to perform a method for determining viewability of an object displayed within a scene, the method comprising performing the following:

dividing said object displayed within said scene into a plurality of segments, each composed of a plurality of pixels;

for each segment of said plurality of segments, determining an average color value based on color encoding values of the pixels within the segment;

identifying one or more segments having a dominating desired color, wherein a segment is determined to have a dominating desired color if the color encoding values of the pixels in the segment are within a threshold distance from the average color value of that segment;

determining an actual color for each of the segments having a dominating desired color, based on visual data of the object as displayed in a rendered scene;

comparing, for each segment having a dominating desired color, the actual color of the segment to a corresponding desired color to generate a color resemblance value; and, based on the color resemblance values of the dominating color segments, calculating a viewability score of the object, being indicative of the object's visibility within said scene.

* * * * *